US008423937B2

(12) United States Patent
Hino et al.

(10) Patent No.: US 8,423,937 B2
(45) Date of Patent: Apr. 16, 2013

(54) SUPPORT PROGRAM, DESIGN SUPPORT DEVICE, AND DESIGN SUPPORT METHOD

(75) Inventors: Toshio Hino, Yokohama (JP); Tsuyoshi Sakata, Yokohama (JP); Tomoyuki Yamada, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 195 days.

(21) Appl. No.: 12/849,337

(22) Filed: Aug. 3, 2010

(65) Prior Publication Data
US 2011/0035716 A1 Feb. 10, 2011

(30) Foreign Application Priority Data

Aug. 5, 2009 (JP) .................. 2009-182364

(51) Int. Cl.
*G06F 17/50* (2006.01)
*G06F 9/455* (2006.01)
(52) U.S. Cl.
USPC ......................................... 716/113; 716/115
(58) Field of Classification Search .................. 716/113, 716/115
See application file for complete search history.

(56) References Cited

U.S. PATENT DOCUMENTS

| 7,089,129 B2 * | 8/2006 | Habitz ............................. 702/65 |
| 7,366,997 B1 * | 4/2008 | Rahmat et al. ................. 716/111 |
| 7,941,772 B2 * | 5/2011 | Bueti et al. ..................... 716/106 |
| 2006/0263913 A1 * | 11/2006 | Marshall .......................... 438/14 |
| 2007/0186201 A1 * | 8/2007 | Itoh et al. .......................... 716/9 |
| 2008/0307277 A1 * | 12/2008 | Tschanz et al. ............... 714/726 |
| 2009/0044160 A1 * | 2/2009 | Bueti et al. ......................... 716/6 |
| 2010/0333057 A1 * | 12/2010 | Tang et al. ..................... 716/126 |
| 2011/0126163 A1 * | 5/2011 | Habitz et al. .................. 716/108 |

FOREIGN PATENT DOCUMENTS

| JP | 09-026983 | 1/1997 |
| JP | 10-134093 | 5/1998 |
| JP | 2001-168200 | 6/2001 |

* cited by examiner

*Primary Examiner* — Vuthe Siek
*Assistant Examiner* — Magid Dimyan
(74) *Attorney, Agent, or Firm* — Staas & Halsey LLP

(57) ABSTRACT

A design support program stored in a recording medium readable by a computer includes acquiring a first analysis result including information about an area included in circuit information of a design target circuit and a second analysis result relating to a path of the circuit information, the temperature of the area being equal to or higher than a certain temperature; determining an arbitrary cell on a non-critical path from among cells arranged in the area as a target cell for decreasing the area temperature; and outputting a result of the determination.

16 Claims, 20 Drawing Sheets

| INSTANCE NAME | TEMPERATURE [C] |
|---|---|
| INST01 | 90 |
| INST02 | 110 |
| INST03 | 120 |
| INST04 | 120 |
| INST05 | 100 |
| INST06 | 95 |
| INST07 | 100 |
| INST08 | 120 |
| INST09 | 128 |
| INST10 | 120 |
| INST11 | 120 |
| INST12 | 100 |
| INST13 | 120 |
| INST14 | 120 |
| INST15 | 123 |
| INST16 | 100 |
| INST17 | 110 |
| INST18 | 120 |
| INST19 | 120 |
| INST20 | 120 |
| INST21 | 110 |

FIG.3

| INSTANCE NAME | CELL NAME |
|---|---|
| INST01 | FF1 |
| INST02 | CLKBUF1 |
| INST03 | CLKBUF2 |
| INST04 | CLKBUF1 |
| INST05 | CLKBUF1 |
| INST06 | CLKBUF1 |
| INST07 | FF1 |
| INST08 | CLKBUF1 |
| INST09 | CLKBUF1 |
| INST10 | BUF1 |
| INST11 | FF1 |
| INST12 | FF1 |
| INST13 | CLKBUF1 |
| INST14 | CLKBUF2 |
| INST15 | BUF4 |
| INST16 | FF1 |
| INST17 | FF1 |
| INST18 | CLKBUF1 |
| INST19 | BUF1 |
| INST20 | INV1 |
| INST21 | FF1 |

| INSTANCE NAME | TEMPERATURE [C] |
|---|---|
| INST01 | 90 |
| INST02 | 110 |
| INST03 | 120 |
| INST04 | 120 |
| INST05 | 100 |
| INST06 | 95 |
| INST07 | 100 |
| INST08 | 120 |
| INST09 | 127 |
| INST10 | 120 |
| INST11 | 120 |
| INST12 | 100 |
| INST13 | 120 |
| INST14 | 120 |
| INST15 | 123 |
| INST16 | 100 |
| INST17 | 110 |
| INST18 | 120 |
| INST19 | 120 |
| INST20 | 120 |
| INST21 | 110 |

FIG.15

| CELL NAME | POWER CONSUMPTION VALUE [μW] |
|---|---|
| CLKBUF1 | 4 |
| CLKBUF2 | 6 |
| CLKBUF4 | 8 |
| BUF1 | 5 |
| BUF2 | 7 |
| BUF4 | 9 |
| INV1 | 2 |
| INV2 | 4 |
| INV4 | 6 |
| FF1 | 11 |
| FF2 | 16 |
| ⋮ | ⋮ |

FIG.18

| INSTANCE NAME | CELL NAME |
|---|---|
| INST01 | FF1 |
| INST02 | CLKBUF1 |
| INST03 | CLKBUF2 |
| INST04 | CLKBUF1 |
| INST05 | CLKBUF1 |
| INST06 | CLKBUF1 |
| INST07 | FF1 |
| INST08 | CLKBUF1 |
| INST09 | CLKBUF1 |
| INST10 | BUF1 |
| INST11 | FF1 |
| INST12 | FF1 |
| INST13 | CLKBUF1 |
| INST14 | CLKBUF2 |
| INST15 | BUF2 |
| INST16 | FF1 |
| INST17 | FF1 |
| INST18 | CLKBUF1 |
| INST19 | BUF1 |
| INST20 | INV1 |
| INST21 | FF1 |

FIG.19

| INSTANCE NAME | TEMPERATURE [C] |
|---|---|
| INST01 | 90 |
| INST02 | 110 |
| INST03 | 120 |
| INST04 | 120 |
| INST05 | 100 |
| INST06 | 95 |
| INST07 | 100 |
| INST08 | 120 |
| INST09 | 126 |
| INST10 | 120 |
| INST11 | 120 |
| INST12 | 100 |
| INST13 | 120 |
| INST14 | 120 |
| INST15 | 122 |
| INST16 | 100 |
| INST17 | 110 |
| INST18 | 120 |
| INST19 | 120 |
| INST20 | 120 |
| INST21 | 110 |

SUPPORT PROGRAM, DESIGN SUPPORT DEVICE, AND DESIGN SUPPORT METHOD

CROSS-REFERENCE TO RELATED APPLICATIONS

This application claims the benefit of priority from Japanese Patent Application No. 2009-182364 filed on Aug. 5, 2009, the entire contents of which are incorporated herein by reference.

BACKGROUND

1. Field

Embodiments discussed herein relate to the layout design of a semiconductor integrated circuit.

2. Description of Related Art

During a thermal analysis, the temperature of each of cells included in the layout data of a circuit is analyzed to specify an area of which temperature becomes equal to and/or higher than a specified temperature in the layout data. A timing analysis is performed based on a result of the thermal analysis.

Related technologies are disclosed in Japanese Laid-open Patent Publication No. 2001-168200, Japanese Laid-open Patent Publication No. H9-26983, Japanese Laid-open Patent Publication No. H10-134093, etc.

SUMMARY

According to one aspect of the embodiments, a design support program stored in a recording medium readable by a computer is provided which includes acquiring a first analysis result including information about an area included in circuit information of a design target circuit and a second analysis result relating to a path of the circuit information, the temperature of the area being equal to or higher than a certain temperature, determining an arbitrary cell on a non-critical path from among cells arranged in the area as a target cell for decreasing the area temperature, and outputting a result of the determination.

Additional advantages and novel features of the invention will be set forth in part in the description that follows, and in part will become more apparent to those skilled in the art upon examination of the following or upon learning by practice of the invention.

The above-described embodiments of the present invention are intended as examples, and all embodiments of the present invention are not limited to including the features described above.

BRIEF DESCRIPTION OF THE DRAWINGS

FIG. 3 illustrates exemplary cells;
FIG. 15 illustrates exemplary library data;
FIG. 18 illustrates exemplary cells;
FIG. 19 illustrates exemplary cell temperatures.

DESCRIPTION OF EMBODIMENTS

Figure 1:
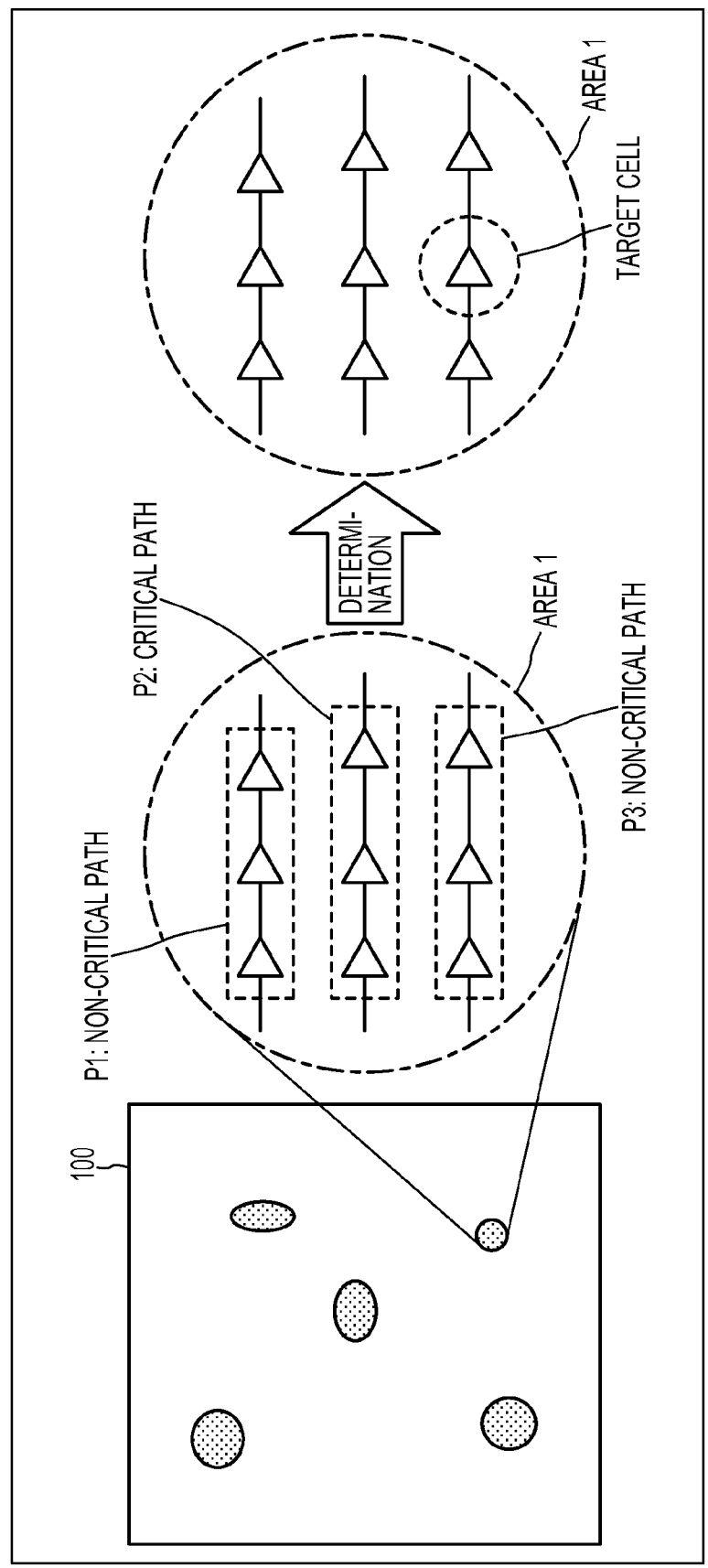
FIG. 1 illustrates an exemplary aspect of embodiments.

Reference may now be made in detail to embodiments of the present invention, examples of which are illustrated in the accompanying drawings, wherein like reference numerals refer to like elements throughout.

If the circuit temperature is locally increased, a timing failure, wiring defects caused by electromigration, and so forth may occur.

FIG. 1 illustrates an exemplary aspect of embodiments. A design support device acquires data of a result of a thermal analysis for a plurality of areas in layout data 100 of a design target circuit such as circular areas, and a result of a path analysis. A temperature of the plurality of areas may be equal to or higher than a specified temperature. For example, paths that are provided in an area 1 may be designated by reference numerals P1, P2, and P3. P1 and P3 may indicate a non-critical path, and P2 may indicate a critical path. The design support device selects an arbitrary cell provided on the non-critical path from among cells that are provided in the area 1 and determines the selected cell as a target for decreasing the temperature of the area 1. In the layout data 100, each of elements is illustrated as a circuit symbol.

For example, the design support device calculates the distance between a cell provided on the critical path arranged in the area 1 and each of cells that are provided on the non-critical path arranged in the area 1. The temperature of the cell provided on the critical path may be equal to or higher than the specified temperature. The design support device may determine the target cell based on each of the distances. The design support device may determine the target cell based on the power consumption value.

The design support device may decrease the temperature of the area 1 by changing the position of the target cell. The design support device may decrease the temperature of the area 1 by coupling resistance to an output of the target cell. The design support device may decrease the temperature of the area 1 by converting the cell type of the target cell.

A target cell to a resistance element being inserted at an output is determined. Layout data and the determination result are supplied to, for example, an automatic arrangement-and-wiring tool. Layout data including a resistance coupled to an output of the target cell is supplied from the tool. An influence on timing or electromigration is reduced so that the temperature of the area whose temperature is equal to or higher than the specified temperature may decrease.

Figure 2:
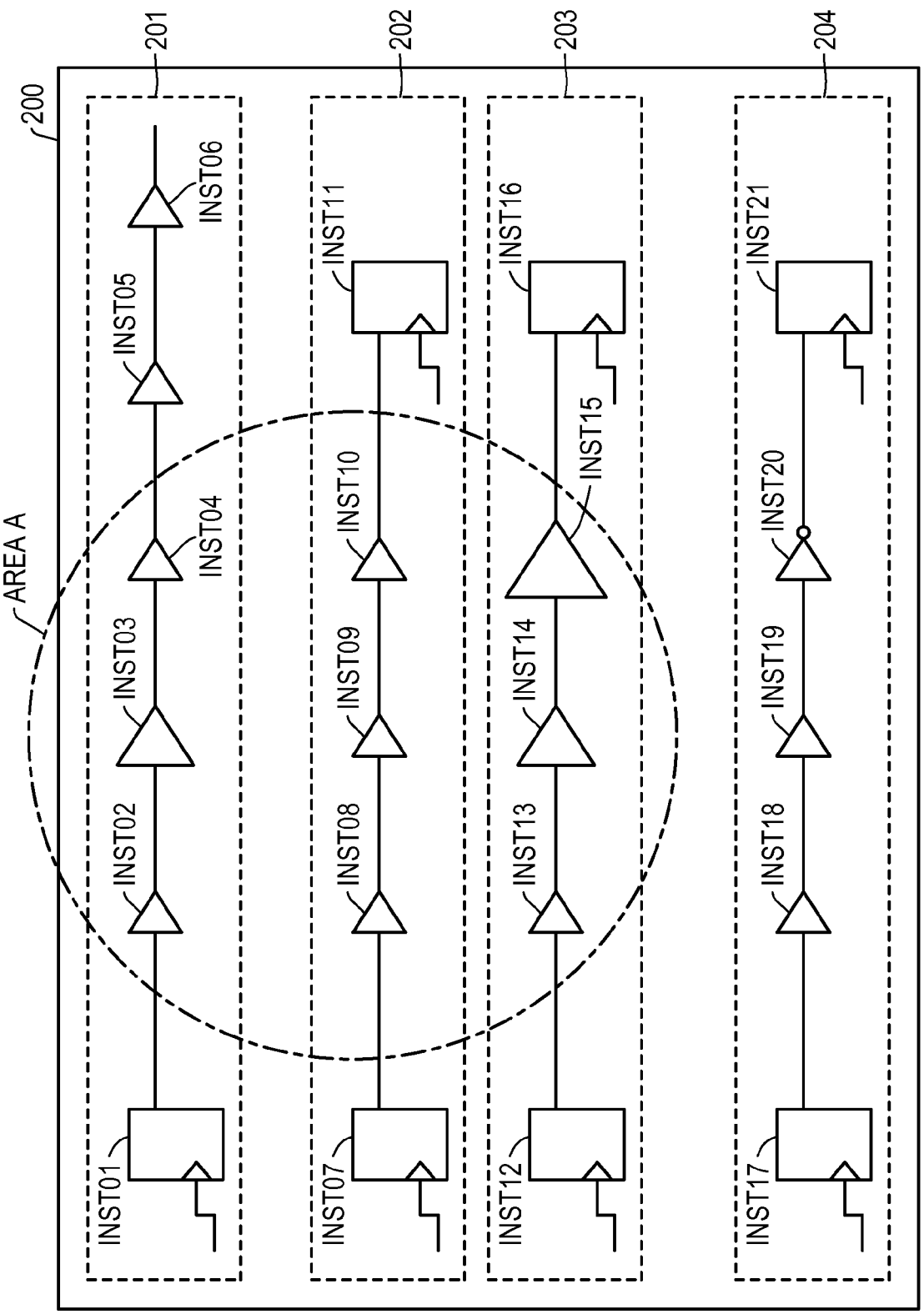
FIG. 2 illustrates layout data in accordance with an exemplary aspect.

FIG. 2 illustrates exemplary layout data. The exemplary layout data illustrated in FIG. 2 may be layout data of a design target circuit. The layout data 200 is under restrictions of by the timing analysis and the power analysis. The layout data 200 includes cells INST01, INST02, INST03, INST04, INST05, and INST06 that are provided on a path 201, cells INST07, INST08, INST09, INST10, and INST11 that are provided on a path 202, cells INST12, INST13, INST14, INST15, and INST16 that are provided on a path 203, and cells INST17, INST18, INST19, INST20, and INST21 that are provided on a path 204. The signs INST1 to INST21 may be instance names for specifying specify the cells. The path 202 may be a critical path, and each of the paths 201, 203, and 204 may be a non-critical path.

The critical path indicates a path having a strict timing condition in the layout data. The critical path may include a path having a strict electromigration in the layout data.

Although the path having the strict electromigration is under restrictions of an electromigration analysis, the path may a small margin for the restrictions.

The path 202 may be a critical path relating to the timing or a critical path relating to the electromigration. Information indicating whether the critical path relates to the timing or not is obtained by the timing analysis. A result of the timing analysis may be added to the layout data 200.

Information indicating whether or not a path relates to the electromigration is obtained by the electromigration analysis.

An area A may be an area of which temperature is equal to or higher than a certain temperature determined by the thermal analysis. The area whose temperature is equal to or higher than the certain temperature may include an area where the average value of the temperatures of cells arranged therein is higher than the certain temperature and an area including at least one cell arranged in the area A, the temperature of the cell being equal to or higher than the certain temperature.

Area information may be output from a tool which automatically analyzes a heat of existing layout data. An area whose temperature is equal to or higher than the certain temperature may be generated based on the cell temperature information output from a tool which automatically analyzes the heat in the layout data. The operation temperature of a design target circuit may fall within the range of from −40° C. to 125° C., and the certain temperature may be 126° C. The area whose temperature is equal to or higher than the certain temperature may include at least one cell whose temperature is equal to or higher than 126° C.

Each of elements included in the layout data 200 is illustrated by a circuit symbol. The layout data 200 may be stored in storage accessible by a computer.

FIG. 3 illustrates an exemplary cell. The exemplary cell may be included in the layout data 200. Table data 205 includes cell names of the layout data 200. Each of the cell names may indicate a cell type. The table data 205 includes an instance name 206 and a cell name 207.

When the instance name 206 indicates the cell INST01, the cell name 207 may be Flip Flop (FF) 1. When the instance name 206 indicates the cell INST02, the cell name 207 may be CLKBUF1. The cell INST02 may be a clock buffer.

When the instance name 206 indicates the cell INST03, the cell name 207 may be CLKBUF2. The cell INST03 may be a clock buffer. Although each of the cells INST02 and INST03 may be a clock buffer, the type of the cell INST02 may be different from that of the cell INST03. The drive capability, the size, the power consumption value, etc. of the cell INST02 may be different from those of the cell INST03. The size of the cell INST03 may be larger than that of the cell INST02. Since the CLKBUF2 is larger than the CLKBUF1, the driving capability and the power consumption of CLKBUF" are high.

When the cell name 207 is shown as BUF1 and BUF4, the cell name 207 may indicate a buffer. The cell type of BUF1 may be different from that of BUF4. When the instance name 206 indicates the cell INST10, the cell name 207 may be BUF1. When the instance name 206 indicates the cell INST15, the cell name 207 may be BUF4. The size of the cell INST15 is larger than that of the cell INST10. Since BUF4 is larger than BUF1, the driving capability and the power consumption of BUF4 is higher than those of BUF1. When the instance name 206 indicates the cell INST20, the cell name 207 may be INV1. The instance name 206 may indicate an inverter.

The sign "CLKBUF" corresponds to a clock buffer, the sign "BUF" corresponds to a buffer, the sign "FF" corresponds to a flip-flop, and the sign "INV" corresponds to an inverter. Although the devices have the same function, the device indicated by a larger number has a larger size, a higher driving capability, and a higher power consumption value than the other.

Figure 4:
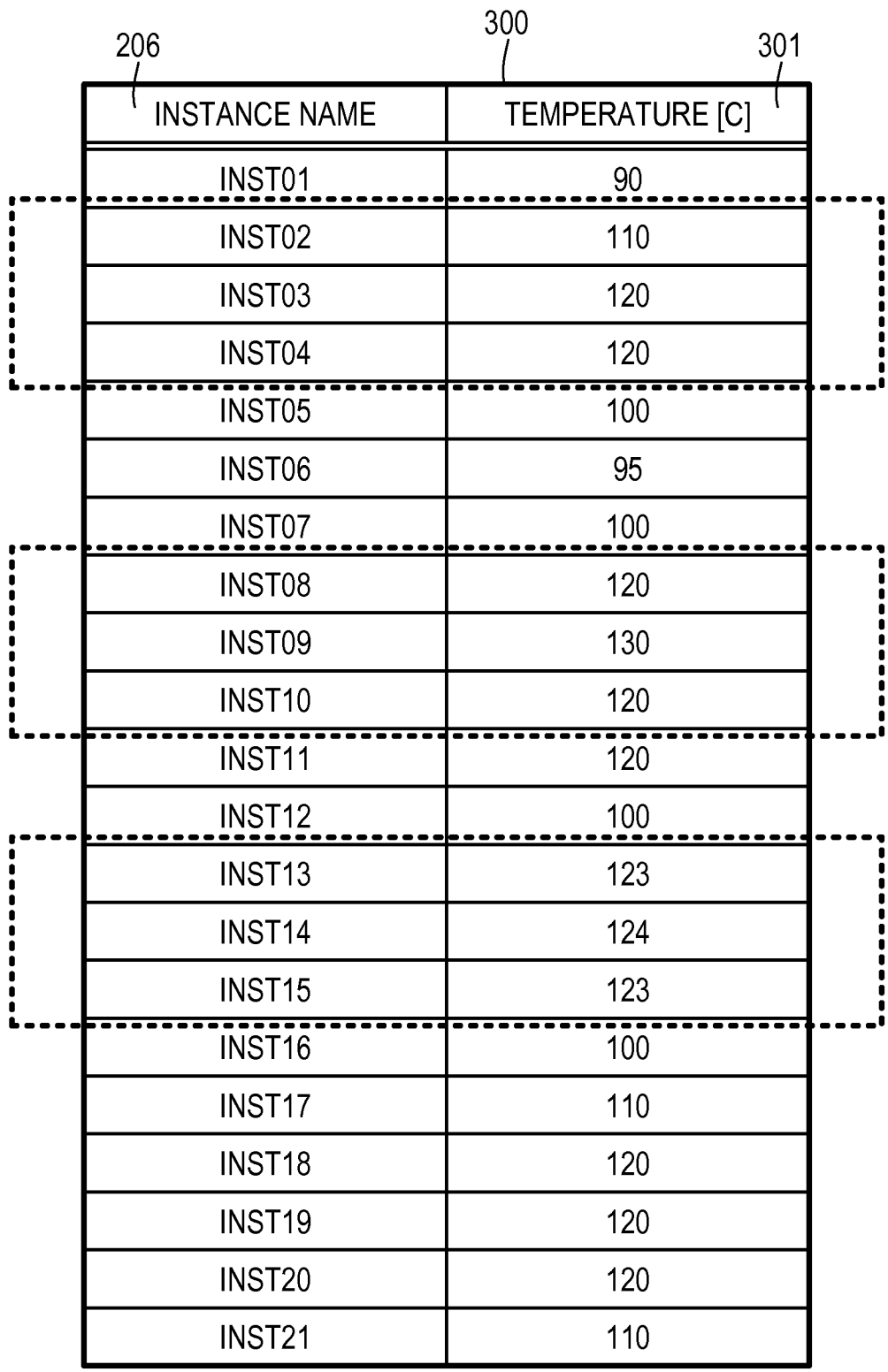
FIG. 4 illustrates exemplary cell temperatures.

FIG. 4 illustrates exemplary cell temperatures. Table data 300 includes the temperature of each of the cells of the layout data 200. The table data 300 includes the instance name 206 and a temperature 301. When the instance name 206 indicates the cell INST02, the temperature 301 may be 110[° C.].

When the instance name 206 indicates the cell INST09, the temperature 301 may be 130[° C.]. The cell INST09 may be a cell whose temperature is equal to or higher than the specified temperature, for example, 126[° C.]. The process may be repeated until the temperature of the cell INST09 becomes less than 126[° C.] and the temperature of a different cell arranged in the area A becomes less than 126[° C.]. Each of dotted boxes illustrated in FIG. 2 includes cells arranged in the area A.

Figure 5:
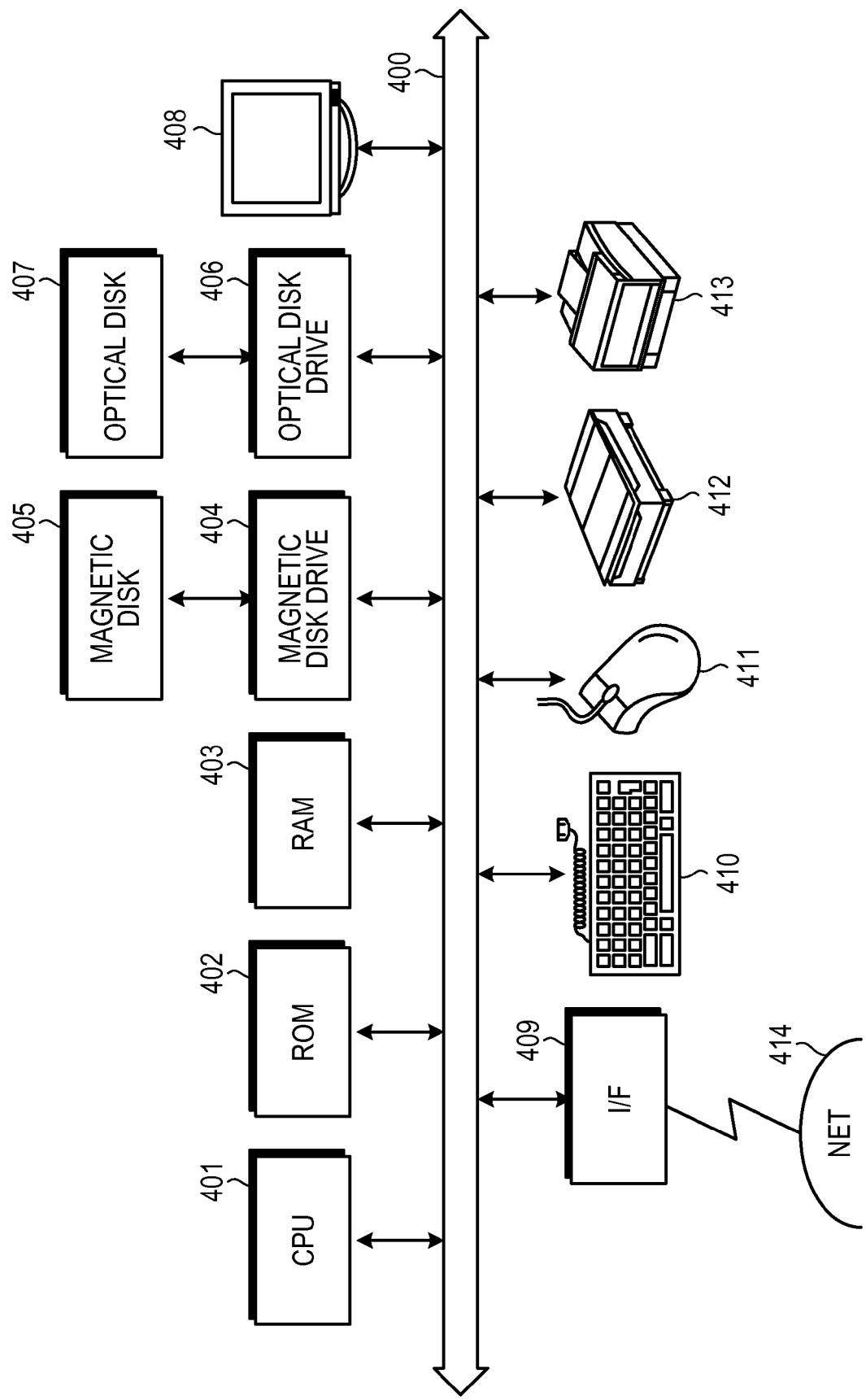
FIG. 5 illustrates an exemplary design support device.

FIG. 5 illustrates an exemplary design support device including a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413. The above-described elements are coupled to one another through a bus 400.

The CPU 401 may control the entire design support device. The ROM 402 stores a program such as a boot program. The RAM 403 is used as a working area of the CPU 401. The magnetic disk drive 404 controls reading from the magnetic disk 405 and writing data to the magnetic disk 405 under the control of the CPU 401. The magnetic disk 405 stores data written thereon under the control of the magnetic disk drive 404.

The optical disk drive 406 controls reading data from the optical device 407 and or writing data to the optical disk 407 under the control of the CPU 401. The optical disk 407 stores data written thereon and a computer reads the stored data under the control of the optical disk drive 406.

The display 408 displays a cursor, an icon, a tool box, text data, image data, function information, and so forth. The display 408 includes, for example, a CRT, a TFT liquid crystal display, a plasma display, etc.

The I/F 409 may be coupled to a network 414 including a local area network (LAN), a wide area network (WAN), the Internet, and so forth via a communication line, and may be coupled to a different device via the network 414. The I/F 409 interfaces between the network 414 and the elements inside the design support device to control data input from the external device and data output to an external device. The I/F 409 includes a modem, a LAN adaptor, and so forth.

The keyboard 410 includes keys for inputting text, numerals, various instructions, and so forth. The keyboard 410 may include, for example, a touch-panel input pad and a touch-panel numeric keypad. The mouse 411 moves a cursor and a window, selects an area, or changes the window size. The mouse 411 may have a function substantially the same as that of a pointing device, and may include a track ball, a joystick, and so forth.

The scanner 412 optically reads image data, and captures the image data to the design support device. The scanner 412 may include an optical character reader (OCR) function. The printer 413 prints image data and text data. The printer 413 may include, for example, a laser printer or an inkjet printer.

Figure 6:
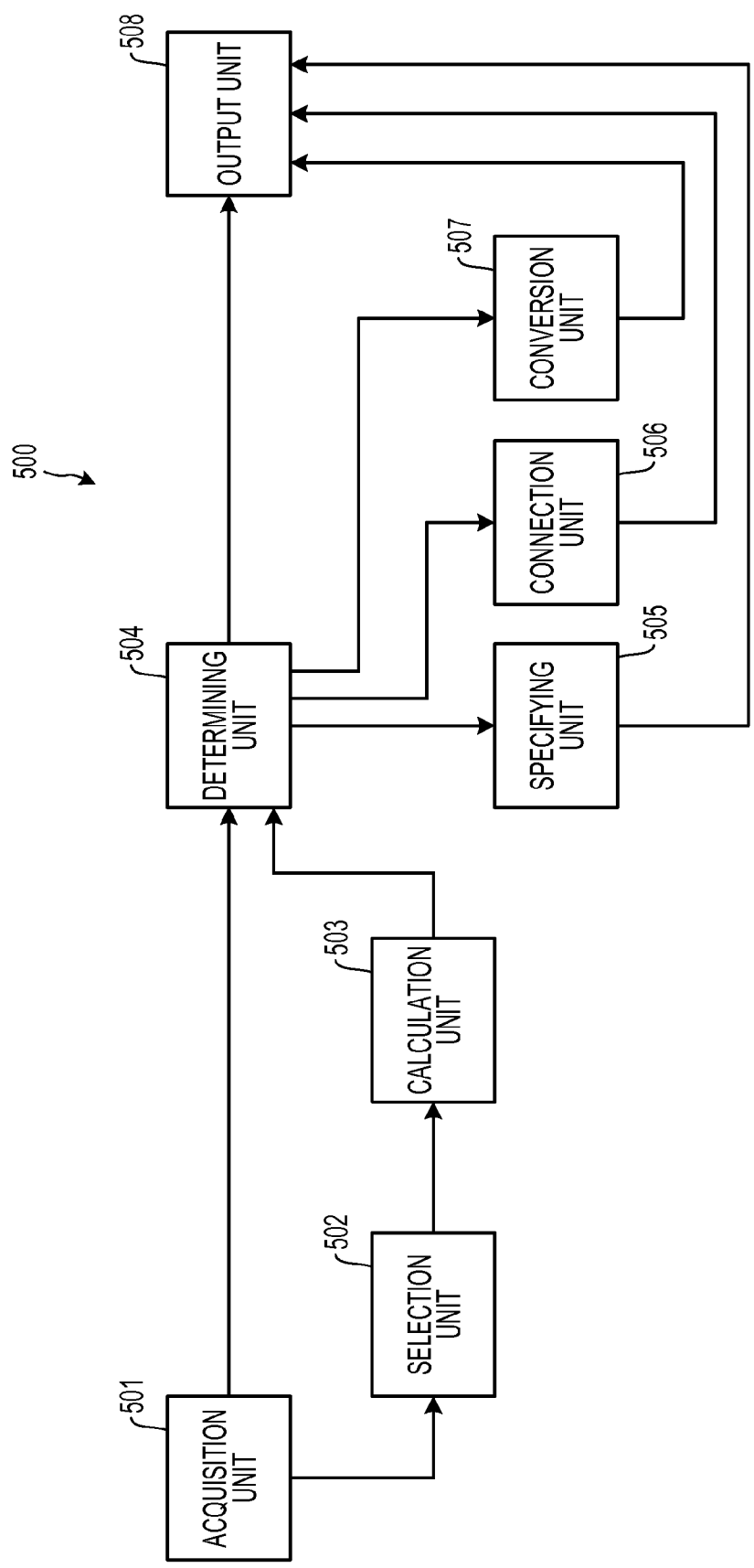
FIG. 6 illustrates an exemplary design support device.

FIG. 6 illustrates a exemplary design support device. The exemplary design support device may include an acquirer 501, a selector 502, a calculator 503, a determiner 504, a specifying unit 505, a connection unit 506, a conversion unit 507, and an output 508. The CPU 401 may execute a program stored in storage including, for example, the ROM 402, the RAM 403, the magnetic disk 405, and the optical disk 407 that are illustrated in FIG. 5.

The acquirer 501 acquires thermal analysis-result including information about an area whose temperature is equal to or higher than the specified temperature in the layout data of a design target circuit, and the result of an analysis relating to a path provided in the layout data. The CPU 401 acquires the layout data 200 to which is supplied with an area whose temperature is equal to or higher than the certain temperature, such as the area A and the table data 300 from a thermal analysis tool or the like. The CPU 401 acquires a result of the timing analysis of the layout data 200 from an automatic timing analysis tool or the like. The timing analysis-result data may be added to the layout data 200.

The determiner 504 determines an arbitrary cell provided on a non-critical path relating to timing based on the timing analysis result from among cells arranged in an area specified by the thermal analysis result as the target cell. For example, an arbitrary cell provided on a non-critical path relating to timing in the cells INST02 to INST04, the cells INST08 to INST10, and the cells INST13 to INST15 that are arranged in an area B is determined as the target cell. The cell provided on the non-critical path relating to timing may be at least one of the cells INST02 to INST04 and the cells INST13 to INST15. The cell INST14 may be determined as the target cell.

The output 508 outputs a result of the determination of the determiner 504. The determination result may be displayed on the display 408, printed through the printer 413, and transmitted to an external device through the I/F 409. The determination result data may be stored in storage including the RAM 403, the magnetic disk 405, the optical disk 407, etc.

The connection unit 506 couples a resistance element to an output of the determined target cell. For example, a resistance element stored in the storage may be arranged in an area where the cell and the wiring of the layout data 200 are not arranged. A connection cell to be coupled to the target cell via the resistance element is specified. One end of the resistance element is coupled to the output of the target cell and the other end of the resistance element is coupled to an input of the connection cell.

The output 508 outputs layout data indicating that the resistance element is coupled by the connection unit 506. The layout data may be displayed on the display 408, printed through the printer 413, or transmitted to an external device through the I/F 409. The layout data may be stored in storage including the RAM 403, the magnetic disk 405, the optical disk 407, etc.

Figure 7:
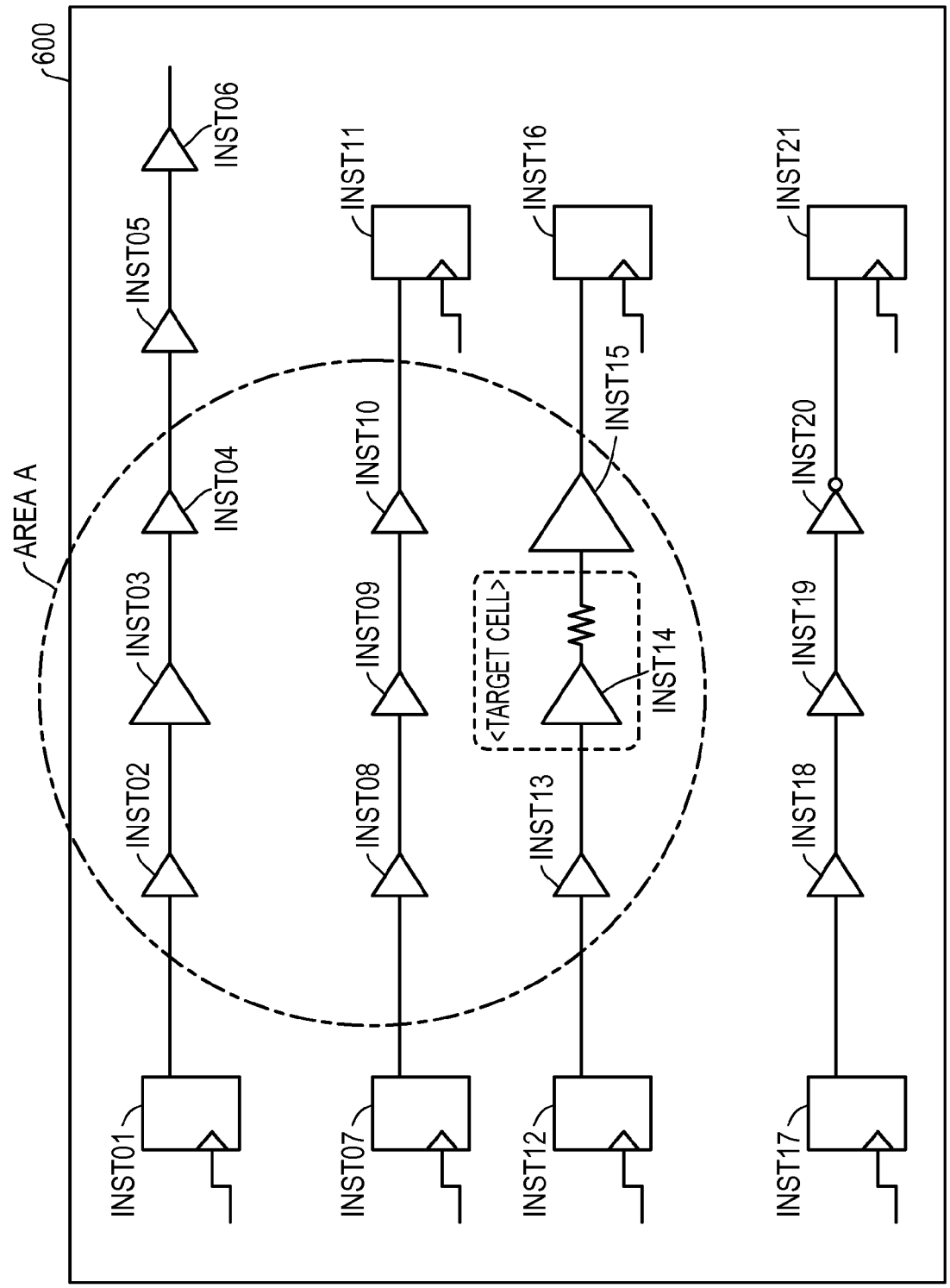
FIG. 7 illustrates exemplary layout data.

FIG. 7 illustrates different exemplary layout data. The layout data 600 illustrated in FIG. 8 may be layout data where a resistance element is coupled by the connection unit 506. In the layout data 600, one end of the resistance element is coupled to an output of the cell INST14. The other end of the resistance element is coupled to an input of the cell INST15. The power consumption of the cell INST14 may reduce and the power consumption of the area A may reduce. Therefore, the temperature attained inside the area A may be decreased.

Figure 8:
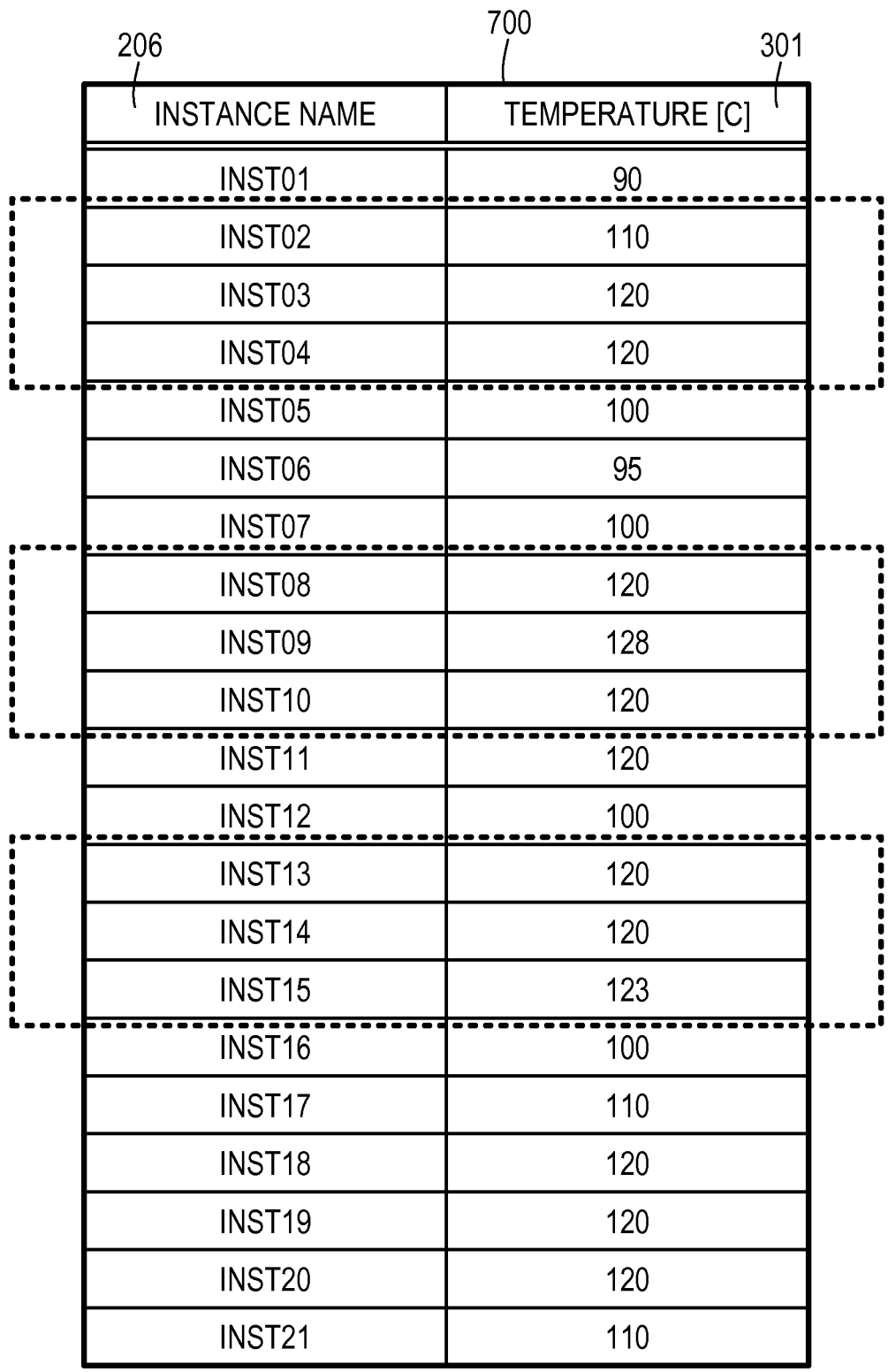
FIG. 8 illustrates exemplary temperatures.

FIG. 8 illustrates exemplary temperatures. Each of the temperatures may be a temperature of a cell of layout data where a resistance element is coupled by the connection unit 506. Each of dotted boxes may indicate cells arranged in the area A. A temperature before the resistance element is coupled to an output of the cell INST14 in the area A may be 124° C. as illustrated in FIG. 4. The temperature of the cell INST14 after the resistance element is coupled to the output of the cell INST14, may be 120° C. as illustrated in FIG. 8.

The temperature of the cell INST09 in the area A, the temperature before the connection may be 130° C. and the temperature after the connection may be 128° C. The temperature of the cell INST09 is equal to or higher than the specified temperature, such as 120° C.

In the design support device 500 illustrated in FIG. 6, the process by the acquirer 501, the determiner 504, the connection unit 506, and the output 508 is repeated until the temperature of each of the cells in the area A becomes less than the given temperature. The temperature inside the area A may decreases and errors due to the local temperature increase may reduce.

Figure 9:
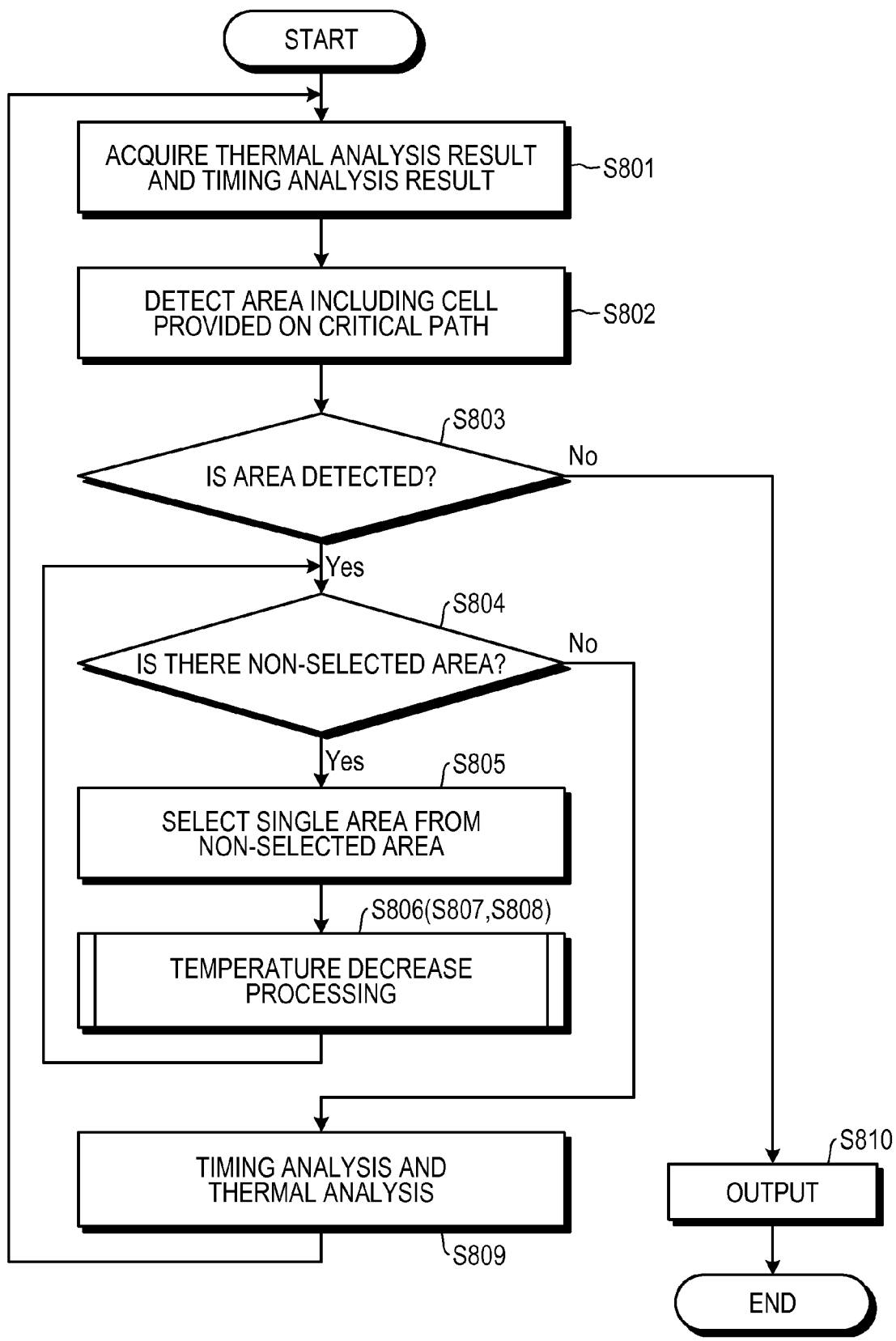
FIG. 9 illustrates an exemplary design support process.

FIG. 9 illustrates exemplary design support process. At operation S801, the acquirer 501 acquires thermal analysis-result including information about an area where temperature is equal to or higher than the given specified temperature in the layout data of a design target circuit, and timing analysis-result. The acquirer 501 may acquire electromigration analysis-result data. In FIG. 8, a critical path relating to timing and a non-critical path relating to the timing may be used.

At operation S802, an area including a cell on the critical path relating to the timing is detected from a plurality of areas whose temperature is equal to or higher than the given temperature. Every area whose temperature is equal to or higher than the given temperature may be detected, and an area including a cell on the critical path relating to the timing may be detected. The temperature of an area affecting the timing may decrease.

It is determined whether or not at least one area is detected at operation S803. If the area is detected (operation S803: Yes), it is determined whether or not at least one non-selected area is included in the detected area at operation S804. If the non-selected area is included (operation S804: No), an area is selected from the non-selected area at operation S805. Temperature decrease process is performed in at least one of operation S806, operation S807 and operation S808. The temperature decrease process includes at least one of the operation S806, the operation S807 and the operation S808. The process processing returns to the operation S804.

When the non-selected area is not included (at operation S804: No), the timing analysis and the thermal analysis are performed on the layout data subjected to the temperature decrease process at the operation S801. The process returns to the operation S801.

When no area is detected (operation S803: No), the output 508 outputs data at the operation S810 and the process is terminated.

Figure 10:
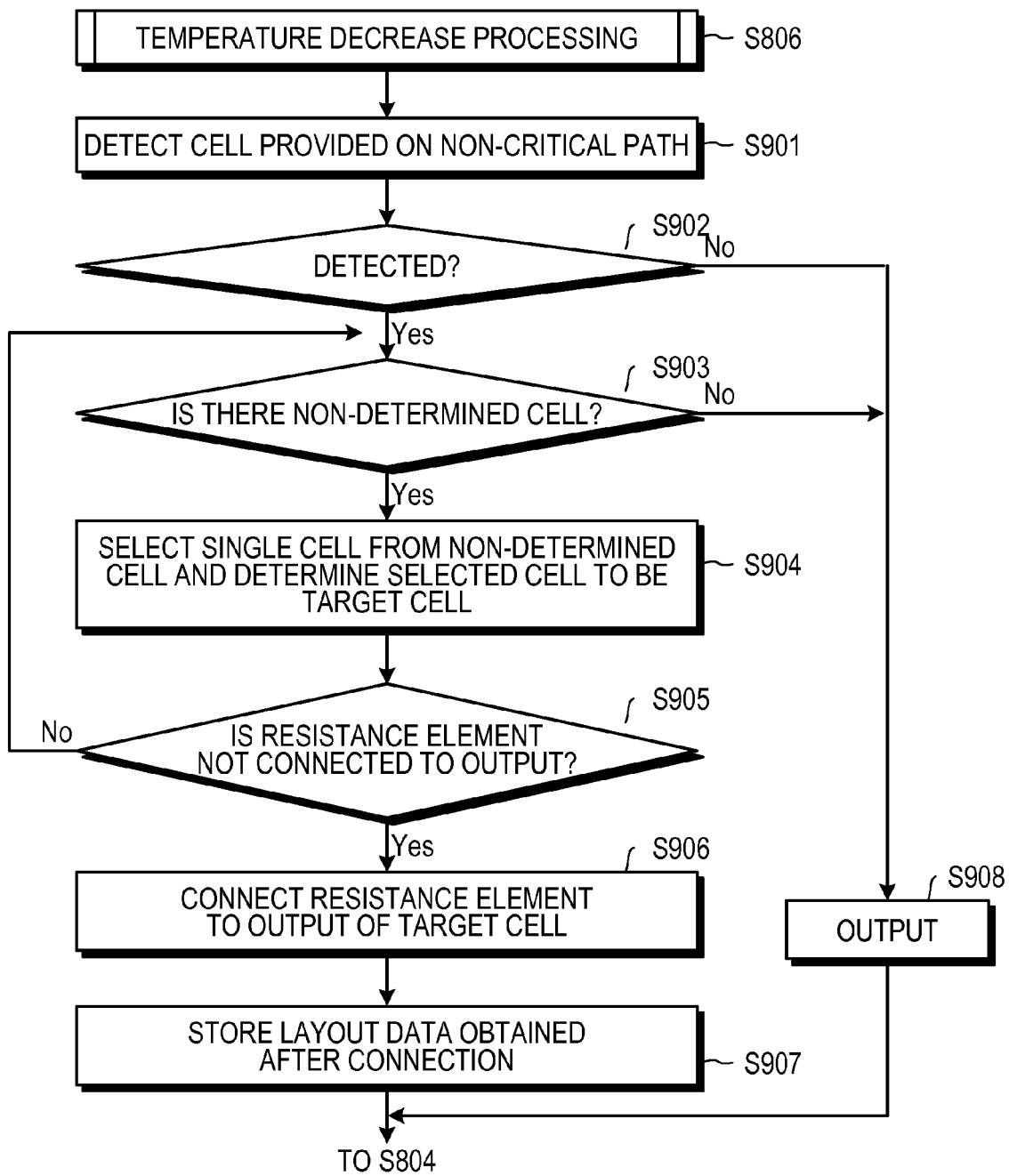
FIG. 10 illustrates exemplary temperature decrease process.

FIG. 10 illustrates an exemplary temperature decrease process. The temperature decrease process illustrated in FIG. 10 may be the temperature decrease process at the operation S806 illustrated in FIG. 9. At operation S901, at least one cell on the non-critical path relating to the timing is detected. When the cell is detected (operation S902: Yes), it is determined whether or not at least one non-determined cell is included in the detected cell at operation S903.

When the non-determined cell is included (operation S903: Yes), the target cell is selected from the non-determined cell at operation S904. It is determined whether or not a resistance element is coupled to an output of the target cell at operation S905. When the resistance element is not coupled to the output of the target cell (operation S905: Yes), the resistance element is coupled to the output of the target cell at operation S906.

At operation S907, layout data where indicating the connection of the resistance element is coupled is stored and the process returns to the operation S804. When the resistance element is coupled to the output of the target cell (operation S905: No), the process returns to the operation S903.

When the cell is not detected (operation S902: No) or the non-determined cell is not included (operation S903: No), data indicating that the area temperature is not decreased is output and the process returns to the operation S804.

The distance between a cell on a critical path in an area whose temperature is equal to or higher than the given temperature and a cell on a non-critical path in the area whose temperature is equal to or higher than the given temperature is calculated. The target cell is selected based on the distance and an area whose temperature is equal to or higher than the given temperature is specified as an area where the arrangement of the target cell is prohibited. The critical path may be related to the timing and the electromigration.

For example, the acquirer 501 illustrated in FIG. 6 acquires a thermal analysis-result and a result of an analysis relating to a path.

The selector 502 illustrated in FIG. 6 selects a cell on the critical path, the temperature of the cell being equal to or higher than the given temperature, from among cells in an area specified based on the acquired thermal analysis-result. The critical path may be obtained by the timing analysis. For example, at least one cell whose temperature is equal to or higher than 126° C., the cell in the area A included in the layout data 200 may be detected from the table data 300. A cell on the critical path is arbitrarily selected from the detected cell. For example, the cell INST09 may be selected.

The output 508 illustrated in FIG. 6 outputs data of the selection result.

The calculator 503 illustrated in FIG. 6 calculates the distance between the selected cell on the critical path and each of cells on a non-critical path in an area whose temperature is equal to or higher than the given temperature. For example, the CPU 401 detects a cell provided on a non-critical path in the area A. For example, the cells INST02 to INST04 and the cells INST13 to INST15 may be detected. The distance between the cell INST09 and each of the detected cells may be calculated.

The determiner 504 illustrated in FIG. 6 determines a cell on the non-critical path whose distance from one of the cells on the critical path is the shortest as the target cell for decreasing the temperature of the area based on the calculation result. For example, a cell closest to the cell INST09 may be determined as the target cell. A cell, which is provided near a cell on a path with strict properties and does not affect the path properties, may be specified.

The output 508 illustrated in FIG. 6 outputs a determination result.

Figure 11:
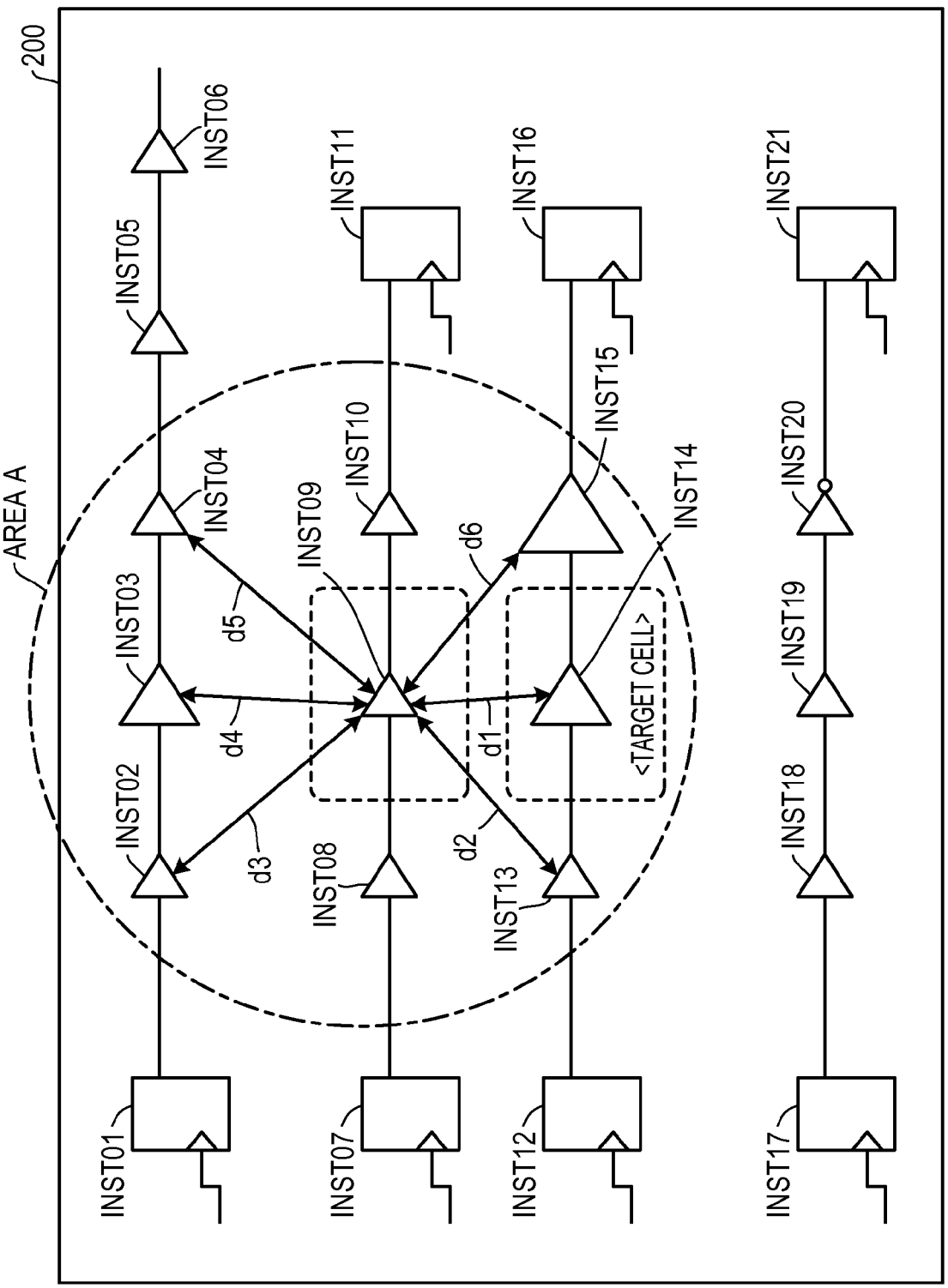
FIG. 11 illustrates an exemplary determination result.

FIG. 11 illustrates an exemplary determination result. The distances between the cell INST09 and the cells on the non-critical path in the area A may be distances d1, d2, d3, d4, d5, and d6. The distance between the cell INST09 and the cell INST14 may be the distance d1. The distance between the cell INST09 and the cell INST13 may be the distance d2. The distance between the cell INST09 and the cell INST02 may be the distance d3. The distance between the cell INST09 and the cell INST03 may be the distance d4. The distance between the cell INST09 and the cell INST04 may be the distance d5. The distance between the cell INST09 and the cell INST15 may be the distance d6. The cell INST14 may be determined as the target cell due to the shortest distance d1.

The specifying unit 505 illustrated in FIG. 6 specifies an area whose temperature is equal to or higher than the given temperature as an area where the arrangement of the target cell is prohibited. For example, the area A is specified as an area where the arrangement of the cell INST14 determined to be the target cell is prohibited. An area other than the area A, where the temperature of the area is equal to and/or higher than the specified temperature, may be specified as the arrangement prohibition area.

The output 508 illustrated in FIG. 6 outputs data of the specification result. The specification result may be displayed on the display 408, printed through the printer 413, and transmitted to an external device by the I/F 409. The specification result may be stored in storage including the RAM 403, the magnetic disk 405, the optical disk 407, and so forth.

The cell INST14 may be rearranged in an area other than the area A based on the output result. For example, the layout data 200 and the specification result may be supplied to the automatic arrangement-and-wiring tool. The automatic arrangement-and-wiring tool rearranges the target cell in the area other than the area A. A cell is rearranged in an area other than an area whose temperature is equal to or higher than the given specified temperature and where cells having temperatures that are equal to or higher than the given temperature are densely arranged. Consequently, the temperatures of the area and the cell may decrease.

Figure 12:
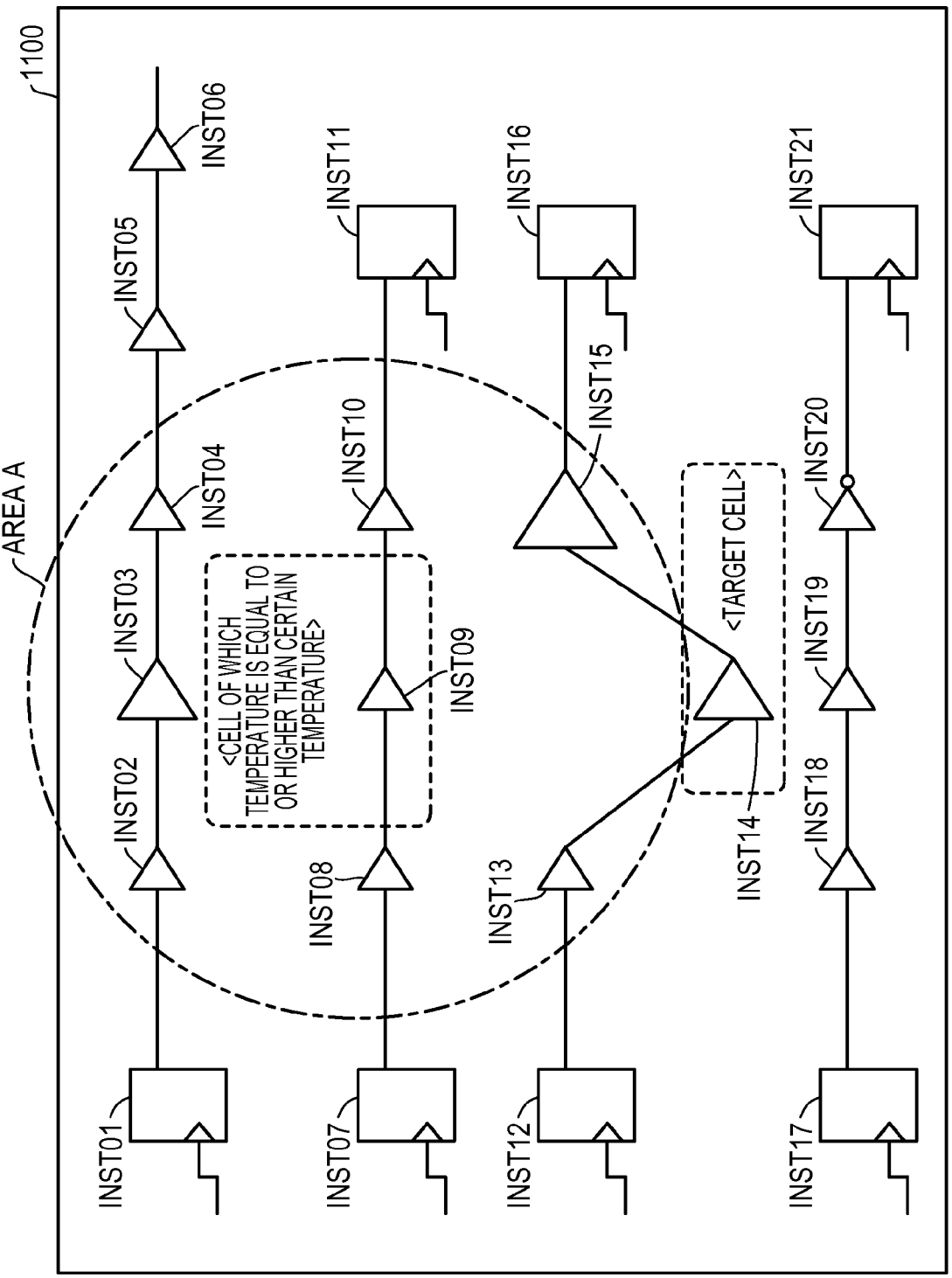
FIG. 12 illustrates an exemplary layout data.

FIG. 12 illustrates an exemplary layout data. The layout data illustrated in FIG. 12 may be layout data after the target cell is rearranged and rewired. In layout data 1100, the cell INST14 is arranged in an area other than the area A, where different cells are not arranged in the area. Cells that are densely arranged near the cell INST09 having a temperature that is equal to or higher than the given temperature are distributed so that the temperatures of the cell INST09 and the area A may decrease.

Figure 13:
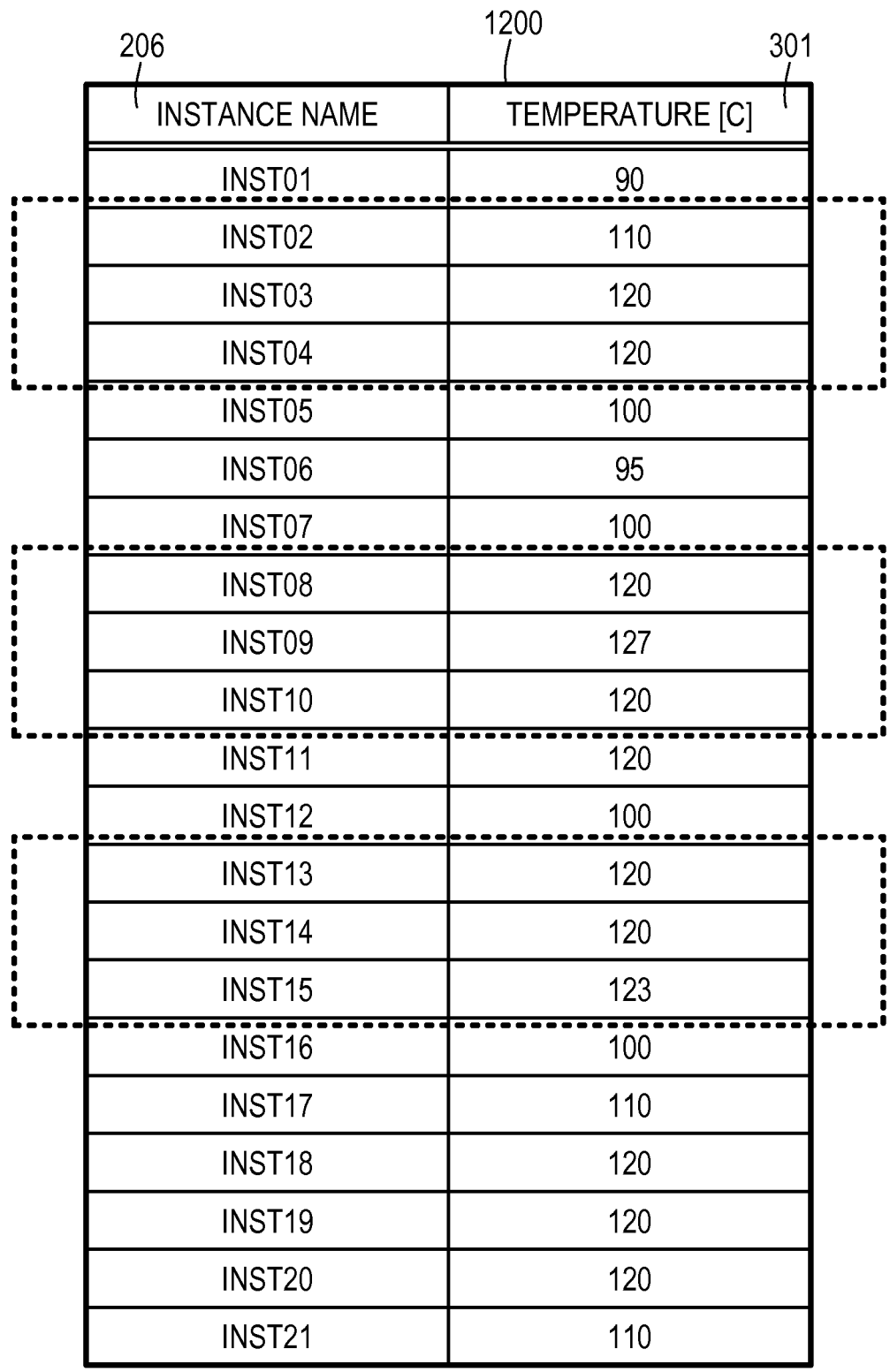
FIG. 13 illustrates exemplary cell temperatures.

FIG. 13 illustrates exemplary cell temperatures. A cell illustrated in FIG. 13 may be a cell after the rearrangement. Table data 1200 illustrates the temperatures of cells included in layout data after the target cell is rearranged and rewired. The cells indicated by dotted boxes may be arranged in the area A. According to the table data 1200, a temperature 301 of the cell INST09 may be 127° C. which is lower than the temperature before the target cell is rearranged and rewired.

In the design support device 500 illustrated in FIG. 6, the process of the acquirer 501, the determiner 504, the specifying unit 505, the connection unit 506, and the output 508 is repeated until the temperature of cells arranged in the area A becomes less than 126° C. The cells that are densely arranged in the area are distributed and the temperature inside the area decreases. Errors caused by locally generated heat may not occur.

Figure 14:
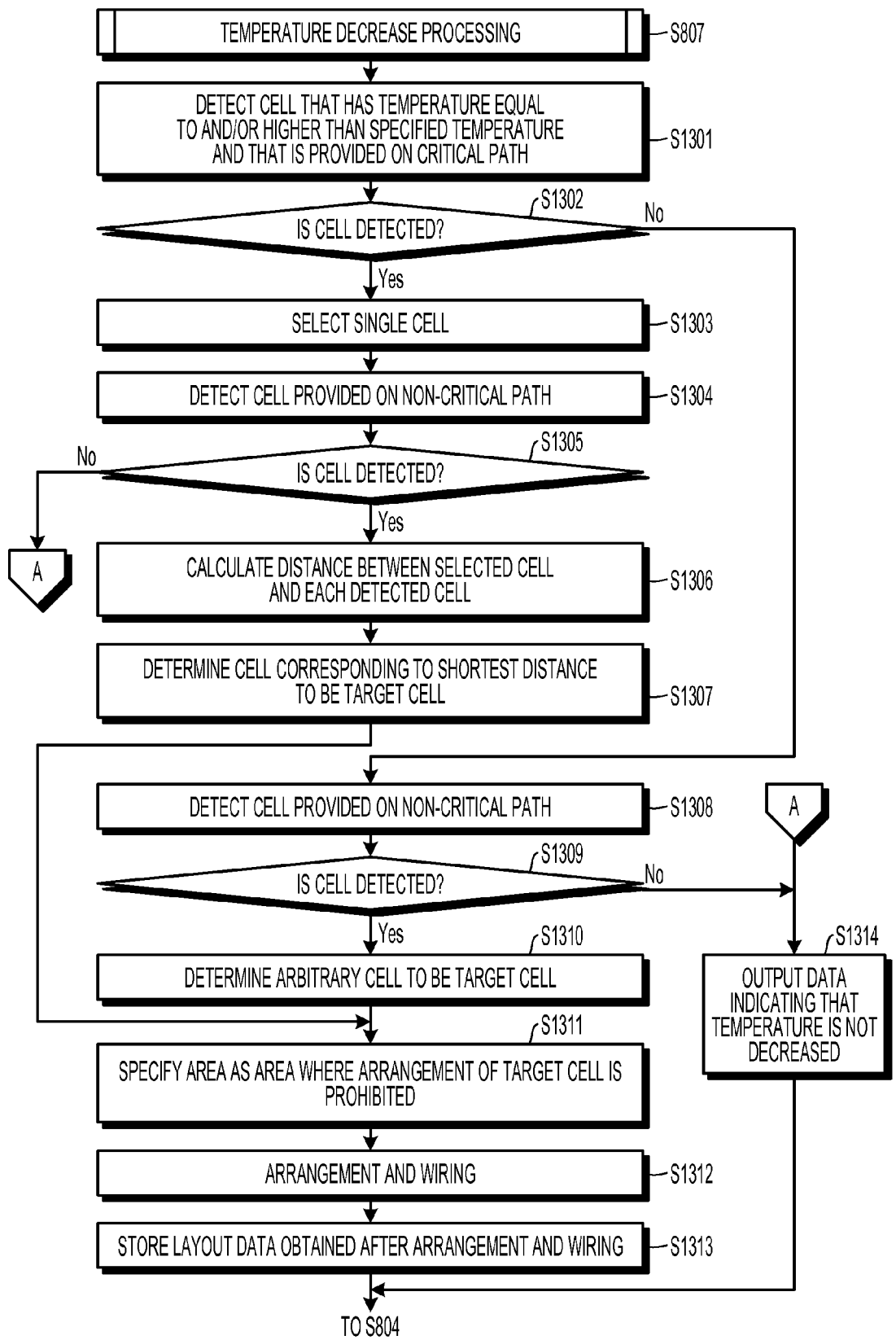
FIG. 14 illustrates an exemplary temperature decrease process.

FIG. 14 illustrates an exemplary temperature decrease process. The temperature decrease process illustrated in FIG. 14 may be the temperature decrease process at operation S807 illustrated in FIG. 8. At operation S1301, at least one cell is detected that is provided on a critical path in an area and has the temperature being equal to or higher than the given temperature. Further, it is determined whether or not the cell is detected at operation S1302.

When the cell is detected (operation S1302: YES), the selector 502 selects a single cell at operation S1303. At least one cell, which is provided on a non-critical path in the area, is detected at operation S1304. It is determined whether or not the cell is detected at operation S1305. When the cell is detected (operation S1305: YES), the calculator 503 calculates the distance between the selected cell and each of the detected cells at operation S1306. The determiner 504 determines the cell corresponding to the shortest distance as the target cell at operation S1307.

When no cell is detected (operation S1302: NO), a cell on the non-critical path in the area is detected at operation S1308, and it is determined whether or not the cell is detected at operation S1309. When the cell is detected (operation S1309: YES), the determiner 504 determines an arbitrary cell as the target cell at operation S1310.

The specifying unit 505 specifies the area as an area where the arrangement of the target cell is prohibited at operation S1311, and an arrangement-and-wiring tool arranges the cell and wires based on the specification result at operation S1312. At operation S1313, the output 508 stores the layout data obtained after the arrangement-and wiring, and the process goes to operation S804.

When it is determined that no cell is detected (operation S1305 : NO, operation S1309: NO), the output 508 outputs data indicating that the temperature is not decreased at operation S1314. Then, the processing goes to operation S804.

The target cell is determined based on the power consumption of a cell on a non-critical path arranged in an area whose temperature is equal to or higher than the given temperature. The type of the target cell is converted to a cell type that has a function, which is substantially the same as that of the target cell, and a power consumption value lower than that of the target cell.

A cell affecting the area temperature is specified in the area whose temperature is equal to or higher than the given temperature. The cell may be automatically specified. The temperature inside the area may decrease. The critical path may relate to the timing and the electromigration.

FIG. 15 illustrates an exemplary library data. The library data 1400 includes the cell name 207 and a power consumption value 1401. For example, the power consumption value 1401 of the cell corresponding to the cell name 207 "CLK-BUF1" is four. For example, the power consumption value 1401 of the cell corresponding to the cell name 207 "CLK-BUF2" is six. The library data 1400 may be stored in storage including the RAM 403, the magnetic disk 405, the optical disk 407, etc. that are accessible by the CPU 401.

The acquirer 501 illustrated in FIG. 6 acquires the thermal analysis result and a result of analyzing a path in the layout data.

The determiner 504 illustrated in FIG. 6 determines a cell, which is provided on a non-critical path and has the highest power consumption, from among cells in an area, which has a temperature equal to or higher than the given temperature and is specified based on the thermal analysis result, as the target cell. The CPU 401 may detect cells that are provided on the non-critical path in the area A. For example, the cells INST02 to INST04 and the cells INST13 to INST15 may be detected.

For example, the CPU 401 searches the power consumption of the detected cells from the library data 1400 in the storage. A cell having the highest power consumption value is determined as the target cell. For example, the cell INST15 is determined as the target cell. A cell affecting an increase in the temperature inside the area is selected from cells which do not affect the path properties.

The output 508 outputs the determination result. The determination result may be displayed on the display 408, printed through the printer 413, and transmitted to an external device through the I/F 409. The determination result may be stored in storage including the RAM 403, the magnetic disk 405, the optical disk 407, and so forth.

Figure 16:
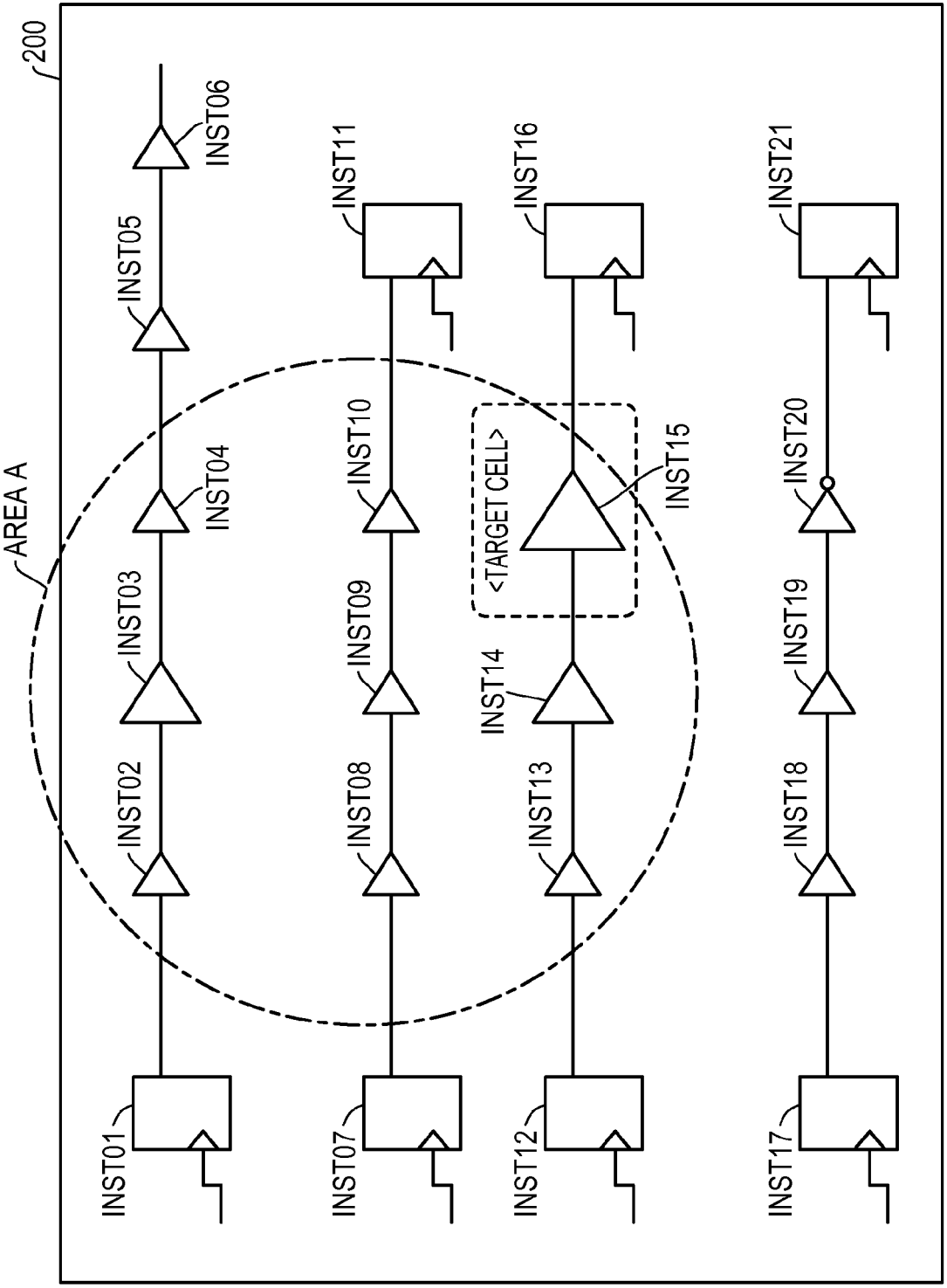
FIG. 16 illustrates exemplary output data.

FIG. 16 illustrates exemplary output data. The output data may indicate that the cell with the highest power consumption is determined as the target cell. For example, the cell INST15 enclosed with a dotted box is determined as the target cell. As illustrated in the table data 205, the cell name 207 of the cell INST15 is illustrated as BUF4. As illustrated in the library data 1400, the power consumption value of the BUF4 is 9 μW.

The conversion unit 507 illustrated in FIG. 6 converts the target cell into a cell that has a function which is substantially the same as that of the target cell and that has a power consumption value lower than that of the target cell.

For example, the CPU 401 reads the cell name 207 and the power consumption value 1401 of the cell having the same function from the library data 1400 based on the cell name 207 of the cell INST15. The CPU 401 specifies the cell name 207 of the cell having a power consumption value lower than that of the cell INST15. For example, the names BUF1 and BUF2 may be specified. When a plurality of names is specified, an arbitrary cell name 207 is selected. For example, the name BF2 may be selected. The cell name 207 of the cell INST15 illustrated in the table data 205 is converted from the name BUF4 into the name BUF2.

The output 508 outputs layout data obtained after the conversion. The layout data may be displayed on the display 408, printed through the printer 413, and output to an external device through the I/F 409. The layout data may be stored in storage including the RAM 403, the magnetic disk 405, the optical disk 407, etc.

Figure 17:
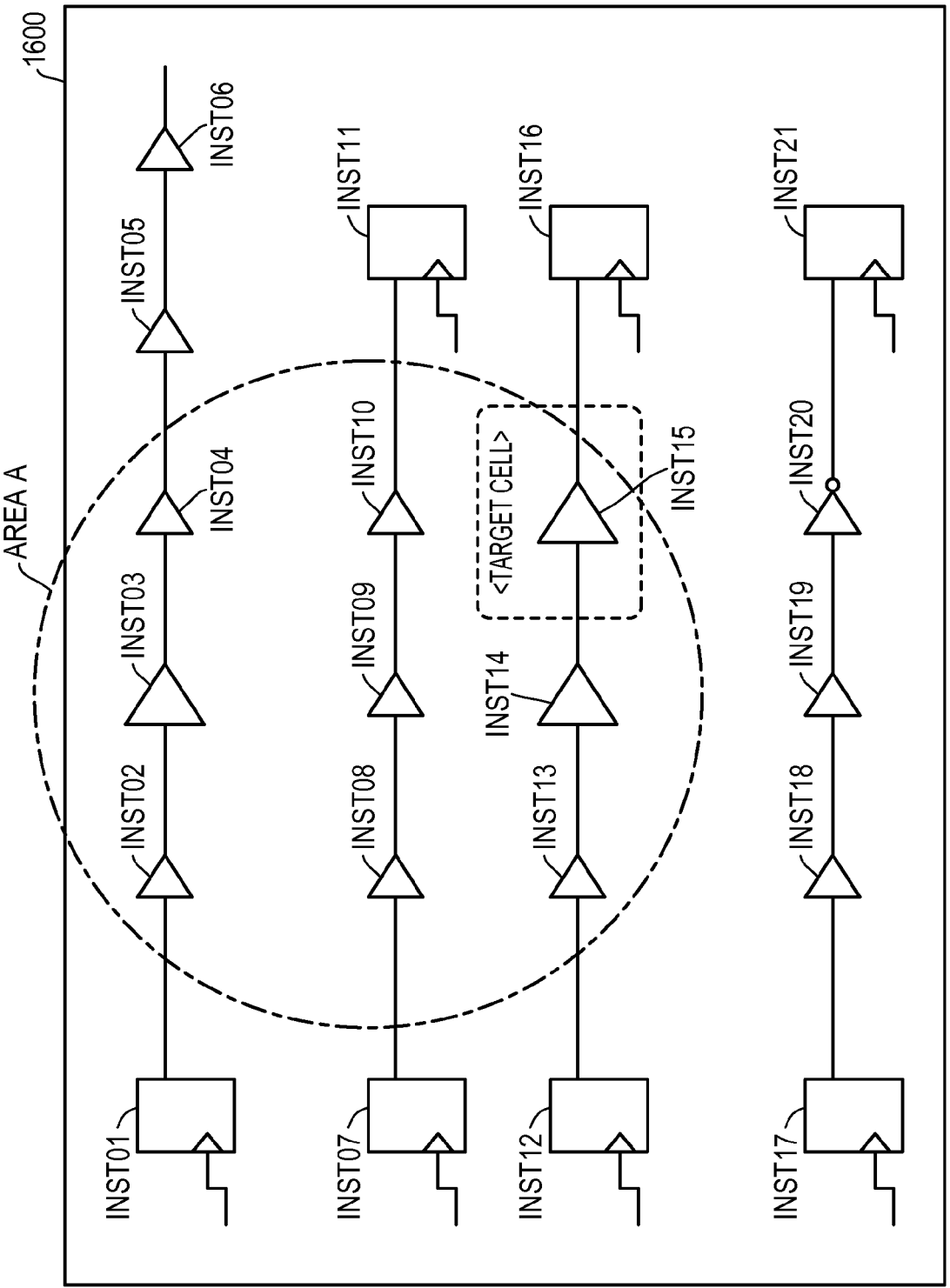
FIG. 17 illustrates exemplary layout data.

FIG. 17 illustrates an exemplary layout data. The layout data 1600 may be the layout data obtained after the conversion. According to the layout data 1600, the cell INST15 may be converted into a cell having a low power consumption value.

FIG. 18 illustrates exemplary cells. The cells illustrated in FIG. 18 may be provided in the layout data 1600. According to table data 1601, the cell name 207 having instance name 206 "INST15" is converted from the name BUF4 to the name BUF2, as illustrated by a dotted box.

FIG. 19 illustrates exemplary cell temperatures. Each of the cells illustrated in FIG. 19 may be a cell obtained after the above-described conversion. Table data 1700 illustrates the temperature of each of cells included in the layout data 1600. The table data 1700 includes the instance name 206 and the temperature 301. Each of cells enclosed with dotted boxes is provided in the area A. For example, the temperature of the cell INST09 obtained before the conversion may be 130° C. as illustrated in the table data 300. However, the temperature of the cell INST09 after the above-described conversion may be 126° C. as illustrated in the table data 1700. After the conversion, the temperature of the cell INST09 may decrease. The temperature of each of cells provided near the target cell decreases with a decrease in the temperature of the target cell. The temperature inside the area also decreases, thereby reducing errors occurring due to locally generated heat.

Since the temperature of the cell INST09 obtained after the conversion is equal to or higher than 126° C., the process of the acquirer 501, the determination unit 504, the conversion unit 507, and the output 508 that are provided in the design support device 500 is repeated.

The determiner 504 may determine a cell, which is provided on a non-critical path from among cells arranged in an area specified based on the thermal analysis result, as the target cell based on the result of an path analysis. The determiner 504 may determine a cell with the highest power consumption from among cells provided on the non-critical path based on the result of an path analysis, of the cells that are arranged in the area specified based on the thermal analysis result, as the target cell.

For example, the cell INST15 may be selected from among the cells INST02 to INST4 and the cells INST13 to INST15, and may be determined as the target cell. The conversion unit 507 converts the cell name 207 of the cell INST15 from the name BUF2 to the name BUF1. The acquirer 501 acquires the result of a thermal analysis and a timing analysis that are performed on layout data obtained after the conversion. The determiner 504 determines the target cell, and the process of the conversion unit 507 and the acquirer 501 is repeated.

When the cell that has the function which is substantially the same as that of the target cell and that consumes power lower than that consumed by the target cell is not detected, the determiner 504 selects a cell, which is provided on the non-critical path and has that consumes the highest power consumption, from among cells other than the cell selected as the target cell, and determines the selected cell as the target cell.

The target cell may be selected based on the power consumption and a resistance value may be coupled to an output of the target cell. The design support device 500 may change the arrangement of the target cell and may couple the resistance value to the output of the target cell.

Figure 20:
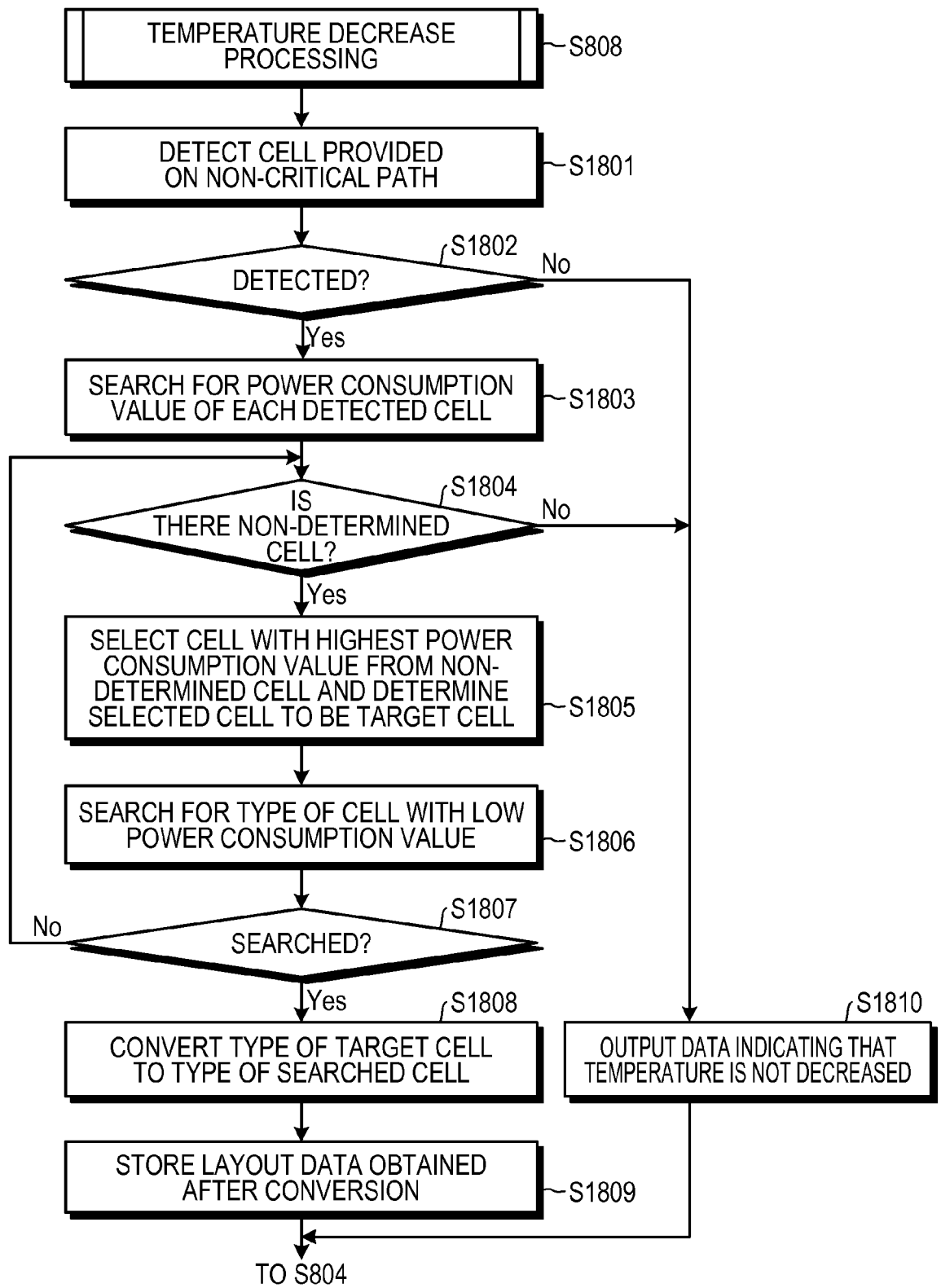
FIG. 20 illustrates an exemplary temperature decrease process.

FIG. 20 illustrates exemplary temperature decrease process. The temperature decrease process may be the temperature decrease process at operation S808 illustrated in FIG. 9. One cell on the non-critical path in the area is detected at operation S1801, and it is determined whether or not the cell is detected at operation S1802. If the cell is detected (operation S1802: YES), library data including the power consumption corresponding to each cell type is searched to find the power consumption the corresponding to the detected cell at operation S1803.

It is determined whether or not one non-determined cell is included in the detected cells at operation S1804. When the non-determined cell is included (operation S1804: YES), the determiner 504 selects a cell with the highest power consumption value from the non-determined cells, and determines the selected cell as the target cell at operation S1805.

At operation S1806, the library data is searched to find the cell type having a function, which is substantially the same as that of the target cell, and power consumption, which is lower than that of the target cell. Then, it is determined whether or not the cell is obtained through the search at operation S1807. When the cell is obtained through the search (operation S1807: YES), the conversion unit 507 converts the type of the target cell to that of the cell obtained by the search at operation S1808.

The output 508 stores layout data obtained after the above-described conversion at operation S1809, and the process goes to operation S804. When the cell is not obtained by the search (operation S1807: NO), the process returns to operation S1804.

When the cell is not detected (operation S1802: NO), data indicating that the area temperature is not decreased is output at operation S1810, and the process goes to operation S804. When the non-determined cell is not included (operation S1804: NO), the process goes to operation S1810.

A design support program is stored in a computer-readable recording medium including a hard disk, a flexible disk, a CD-ROM, an MO, a DVD, and so forth. A computer may read the design support program from the recording medium for execution. The design support program may be distributed via a network including, for example, the Internet.

Example embodiments of the present invention have now been described in accordance with the above advantages. It will be appreciated that these examples are merely illustrative of the invention. Many variations and modifications will be apparent to those skilled in the art.

Although a few preferred embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A non-transitory computer-readable recording medium that stores therein a design support program, the design support program causing a computer to execute operations of:
    acquiring a first analysis result including information about an area of which temperature becomes equal to or higher than a certain temperature, the area being included in circuit information of a design target circuit and a second analysis result relating to a path of the circuit information;
    determining an arbitrary cell on a non-critical path from among cells arranged in the area as a target cell for decreasing the temperature of the area; and
    outputting a result of the determination.

2. The non-transitory computer-readable recording medium according to claim 1, wherein the non-critical path is detected based on the second analysis result.

3. The non-transitory computer-readable recording medium according to claim 1, wherein the arbitrary cell consumes high power.

4. The non-transitory computer-readable recording medium according to claim 1, the design support program further causing the computer to execute:
    selecting a cell that has a temperature which is equal to or higher than the certain temperature and is provided on a critical path is selected from among the cells in the area;
    calculating a distance between the selected cell and a cell on the non-critical path in the area; and
    determining a cell corresponding to a shortest distance between the selected cell and the cell on the non-critical path as the target cell.

5. The non-transitory computer-readable recording medium according to claim 4, wherein the critical path is detected based on the second analysis result.

6. The non-transitory computer-readable recording medium according to claim 1, the design support program further causing the computer to execute:
    setting the area as an area where arrangement of the target cell is prohibited, and
    outputting a result of the setting.

7. The non-transitory computer-readable recording medium according to claim 1, the design support program further causing the computer to execute:
    converting the target cell into a cell having a function, which is substantially the same as a function of the target cell, and lower power consumption that the target cell; and
    outputting circuit information obtained after a conversion.

8. The non-transitory computer-readable recording medium according to claim 1, the design support program further causing the computer to execute:
    coupling a resistance element to an output of the target cell; and
    outputting circuit information obtained after the coupling.

9. The non-transitory computer-readable recording medium according to claim 1, wherein the second analysis result includes a result of a timing analysis of a path included in the circuit information.

10. The non-transitory computer-readable recording medium according to claim 1, wherein the second analysis result includes a result of an electromigration analysis of a path included in the circuit information.

11. A design support device comprising:
an acquirer configured to acquire a first analysis result including information about an area of which temperature becomes equal to or higher than a certain temperature, the area being included in circuit information of a design target circuit and a second analysis result relating to a path of the circuit information;
a determiner configured to determine an arbitrary cell on a non-critical path from among cells in the area as a target cell for decreasing the temperature of the area; and
an output configured to output a result of a determination.

12. The design support device according to claim 11, wherein the determiner detects the non-critical path based on the second analysis result.

13. The design support device according to claim 11, wherein the determiner selects a cell that consumes high power as the target cell.

14. The design support device according to claim 11, further comprising:
a selector configured to select a cell, which has a temperature being equal to or higher than the certain temperature and is provided on a critical path, from among the cells arranged in the area; and
a calculator configured to calculate a distance between the selected cell and a cell on the non-critical path in the area,
wherein the determiner determines a cell corresponding to a shortest distance between the selected cell and the cell on the non-critical path as the target cell.

15. The design support device according to claim 11, wherein the critical path is detected based on the second analysis result.

16. A design support method, comprising by a computer, operations including:
acquiring a first analysis result including information about an area of which temperature becomes equal to or higher than a certain temperature, the area being included in circuit information of a design target circuit and a second analysis result relating to a path of the circuit information;
determining, using the computer, an arbitrary cell on a non-critical path from among cells arranged in the area as a target cell for decreasing the temperature of the area; and
outputting a result of the determination.

* * * * *

UNITED STATES PATENT AND TRADEMARK OFFICE
CERTIFICATE OF CORRECTION

PATENT NO. : 8,423,937 B2
APPLICATION NO. : 12/849337
DATED : April 16, 2013
INVENTOR(S) : Toshio Hino et al.

It is certified that error appears in the above-identified patent and that said Letters Patent is hereby corrected as shown below:

On the Title Page, Item (54) and in the Specification, Column 1, Line 1, Title, before "SUPPORT PROGRAM," insert -- DESIGN --.

Signed and Sealed this
Thirteenth Day of August, 2013

Teresa Stanek Rea
*Acting Director of the United States Patent and Trademark Office*